June 26, 1956 C. A. PRIEBE 2,752,480
VEHICLE LIGHT CONSTRUCTION
Filed April 9, 1953
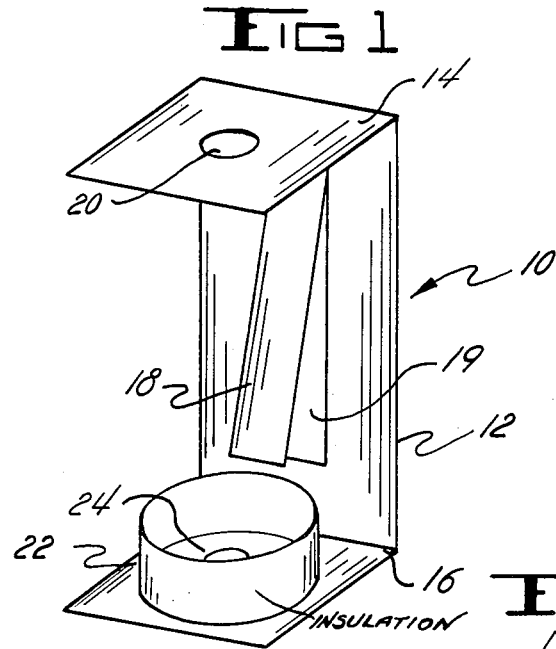
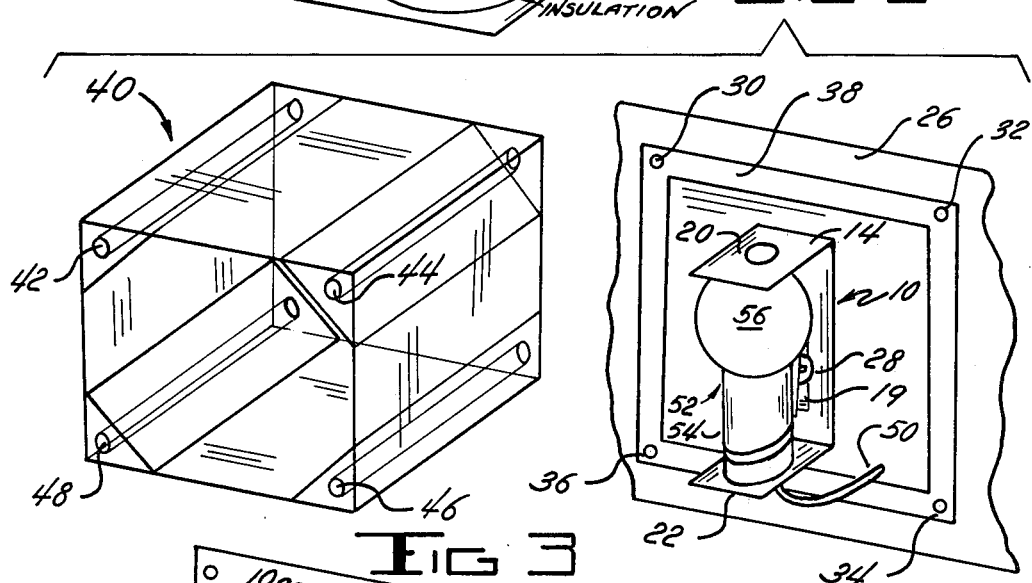
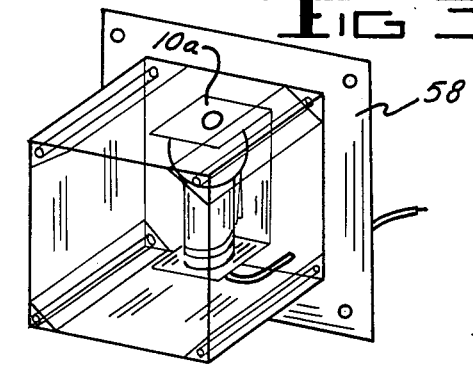
INVENTOR
CLARENCE A. PRIEBE
SMITH & OLSEN
BY ATTORNEYS

United States Patent Office 2,752,480
Patented June 26, 1956

2,752,480

VEHICLE LIGHT CONSTRUCTION

Clarence A. Priebe, Lincoln Park, Mich.

Application April 9, 1953, Serial No. 347,656

4 Claims. (Cl. 240—8.2)

The present invention relates to a light construction, and more particularly to a marker light construction for vehicles such as a running light for trucks.

Prior to the present invention, it has been conventional practice to use the spring-pressed connection which is well known in its use with automobile taillights. In such construction, the lead-in wire is fed into the back of the light shell and the end of the lead-in wire has a contact portion formed thereon. Disposed around the wire and between the contact portion and the rear portion of the light shell is a coil spring. Thus, when the lamp is placed into position and the ears or lugs are turned into engagement with the bayonet slots in the adjacent lamp retainer, the contact member on the end of the lead-in wire is pushed back and the contact member is engaged against the lamp under spring tension. The fact that the lead-in wire must move in and out prevents any effective seal being formed around the lead-in wire at the light shell. Thus, it is common for moisture and dirt to seep into the interior of the light shell and around the spring. The spring corrodes and there is a poor connection between the contact member with the lamp base.

Applicant has been in the trucking business for many years, and such constructions have proven unsatisfactory as running lights. It is not uncommon for a running light to be on when checked at the start of a trip, and then go out when the truck is driven over a bumpy road. This subjects the operator of the truck to the possibility of a road fine for driving without a full set of running lights.

Further, when one of the lamps is burned out, it is difficult to remove the old lamp in order to insert a new one. Corrosion is usually so bad that it is necessary to break the glass bulb portion of the lamp and use a pair of pliers to engage the metal base of the lamp and twist it out of engagement with the lamp retaining portion of the light construction. In many instances, it is necessary to use a screwdriver to jimmy the ears or bosses of the lamp loose from the bayonet locking groove of the lamp retainer, and this distorts the retainer and prevents proper engagement between the new lamp and the retainer.

Therefore, it is a principal object of the present invention to provide a vehicle marker light assembly which is simple in construction and which is efficient in operation.

It is a further object of the present invention to provide a vehicle marker light construction which is inexpensive to manufacture and which can be supplied to the purchaser at a minimum cost.

It is another object of the present invention to provide a lamp bracket for a light construction which eliminates coil springs and other mechanisms conducive to ineffective operation, which provides a sturdy seat for a lamp, and which permits easy and rapid installation and removal of the lamps.

Other objects of this invention will appear in the following description and appended claims, reference being had to the accompanying drawings forming a part of this specification wherein like reference characters designate corresponding parts in the several views.

In the drawings:

Fig. 1 is an enlarged perspective view of the lamp bracket of the present invention.

Fig. 2 is a perspective view of the lamp bracket affixed to a portion of a truck van, the lens being shown in a position removed from the truck van.

Fig. 3 is a perspective view of another modification of the light construction showing the entire assembly in a self-contained unit.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Fig. 1 of the drawings, the lamp bracket of the present invention is indicated generally at 10. The bracket is formed of a resilient electrically conductive material such as spring steel. The body of the bracket is substantially C-shaped and includes the upright leg 12 having the upper finger 14 and the lower finger 16 extending outwardly therefrom. A three-sided cut is effected in the leg 12 and the ground arm 18 produced thereby is moved inwardly from the opening 19 formed by the cut. A bulb retaining hole 20 is formed in the upper finger 14. A seating cup 22 is provided on the lower finger 16. This cup is formed of any suitable insulating material such as Bakelite, and a contact portion 24 of electrically conducting material is formed at the bottom of the cup. The contact portion 24 is adapted for connection to the usual lead-in wire from the power source.

Fig. 2 of the drawings shows one embodiment of the present invention wherein the bracket 10 is affixed directly to the frame or body 26 of a truck. As shown in this view of the drawings, a bolt 28 is extended through the opening 19 in the bracket 10 and through a hole (not shown) drilled in the truck body 26. The head of the bolt 28 is larger than the width of the opening 19 in the bracket 10 and holds the bracket 10 tightly against the truck body 26. Four holes 30, 32, 34, and 36 are drilled through the truck body, and a sealing gasket 38 is positioned around the bracket 10.

A box-shaped plastic lens is indicated at 40. The word "lens" is used as a term of art and denotes the usual transparent covering disposed over light constructions such as tail lights and running lights. This lens may be formed of any of the well known sturdy transparent plastics presently available. The corners of the lens 40 are reinforced so that the bolt holes 42, 44, 46 and 48 may be provided. These bolt holes are aligned with the holes 30, 32, and 34 and 36 respectively in the truck body 26 when the lens is attached. Bolts (not shown) are then inserted through the bolt holes to affix the lens 40 firmly against the sealing gasket 38 disposed on the truck body 26.

The lead-in wire is shown at 50 in Fig. 2. This wire is affixed to the contact portion 24 (Fig. 1) of the cup 22 in any suitable manner such as by clipping, soldering etc. When the lamp 52 is placed in position, the metal base 54 is seated in the cup 22, and the upper finger 14 is lifted up to permit the bulb 56 to pass into the bracket. When the upper finger 14 is released it springs back toward its normal position, and the hole 20 engages the top of the bulb 56 of the lamp to hold the same securely in position. It will be seen that when the lens 40 is placed in position, the lead wire 50 is encased within the waterproof joint provided by the sealing gasket 38. There are no close fitting bayonet locks and no coil spring mechanisms to render insertion and removal of the lamp a difficult operation. The usual metal light shell has been eliminated, and the running light construction shown in this embodiment of the invention is provided with a minimum of material.

Fig. 3 shows the running light as a self-contained unit. In this modification of the invention, a backing plate 58 is provided. The bracket 10a may be affixed to the backing plate 58 in any suitable manner such as welding. With this construction it is merely necessary to drill four holes in the truck frame or body and affix the backing plate in position with bolts or other fasteners.

Both embodiments of the running light of the present invention have been in use on applicant's truck and have proven extremely efficient in operation over all types of terrain. The light construction of the present invention has proven to be a simple and efficient solution to a problem long existent in the trucking business.

Having thus described my invention, I claim:

1. A substantially C-shaped light bracket for use with a lamp having a base and a bulb affixed thereto, comprising an upright leg, an unrestrained resilient upper finger forming substantially a right angle with said upright leg, an unrestrained resilient lower finger forming substantially a right angle with said upright leg, bulb retaining means in said upper finger adapted to engage the top of a lamp bulb and hold the same in position under a cushioned preload exerted by resilient upper finger, a lamp base seat formed in said lower finger and adapted to seat a lamp base and hold the same in position under a cushioned preload exerted by said resilient lower finger, a lamp grounding member provided by said bracket and adapted to contact the side of the lamp base, and attaching means on said upright leg for use in affixing the bracket to a suitable backing, the positioning of said attaching means on said leg leaving said fingers free to resiliently hold the lamp.

2. A substantially C-shaped light bracket for use with a lamp having a base and a bulb affixed thereto, said bracket being formed of resilient electrically conducting material and comprising an upright leg, a grounding arm formed in said upright leg and extending inwardly from said upright leg within the confines of said C-shaped bracket for contact with the side of a lamp base, the opening in said upright leg formed by said grounding arm providing a slot which is adapted to seat a fastener for affixing said bracket to a suitable backing, an unrestrained resilient upper finger forming substantially a right angle with said upright leg, an unrestrained resilient lower finger forming substantially a right angle with said upright leg, bulb retaining means in said upper finger adapted to engage the top of a lamp bulb and hold the same in position under a cushioned preload exerted by said resilient upper finger, a lamp base seat and primary contact formed in said lower finger and adapted to seat a lamp base and hold the same in position under a cushioned preload exerted by said resilient lower finger, the positioning of the fastening means on the upright leg leaving the fingers free to resiliently hold the lamp, and the grounding arm aiding in holding the lamp bulb in place.

3. In combination, a metal backing means, a substantially C-shaped bracket including an upright leg, an unrestrained upper finger forming substantially a right angle with said upright leg, an unrestrained resilient lower finger forming substantially a right angle with said upright leg, bulb retaining means in said upper finger adapted to engage the top of a lamp bulb and hold the same in position under a cushioned preload exerted by said resilient upper finger, a lamp base seat and primary contact formed in said lower finger and adapted to seat a lamp base and hold the same in position under a cushioned preload exerted by said resilient lower finger, and a lamp grounding member provided by said bracket and adapted to contact the side of the lamp base, attaching means attaching the upright leg of said bracket to said backing means, the positioning of said attaching means on said upright leg leaving said fingers free to resiliently hold the lamp, a lens disposed over said bracket and against said backing means, a lead-in wire extending through said backing means and affixed to said primary contact so that all electrical connections are completely encased within said lens.

4. In combination, a metal vehicle structure, a substantially C-shaped bracket of electrically conducting resilient material including an upright leg, an unrestrained upper finger forming substantially a right angle with said upright leg, and an unrestrained lower finger forming substantially a right angle with said upright leg, bulb retaining means in said upper finger adapted to engage the top of a lamp bulb and hold the same in position under a cushioned preload exerted by said resilient upper finger, a lamp base seat and primary contact formed in said lower finger and adapted to seat a lamp base and hold the same in position under a cushioned preload exerted by said resilient lower finger, and a lamp grounding member provided by said bracket and adapted to contact the side of the lamp base, fastening means fastening the upright leg of said bracket directly against said metal vehicle structure, the positioning of said fastening means on said upright leg leaving said fingers free to resiliently hold the lamp, a lens disposed over said bracket and against said metal vehicle structure, a lead-in wire extending through said metal vehicle structure affixed to said primary contact so that all electrical connections are completely encased within said lens.

References Cited in the file of this patent

UNITED STATES PATENTS

| | | |
|---|---|---|
| 1,640,831 | Hunt | Aug. 30, 1927 |
| 2,082,659 | Sauer | June 1, 1937 |
| 2,236,071 | Roskam et al. | Mar. 25, 1941 |
| 2,343,598 | Wagner | Mar. 7, 1948 |
| 2,522,660 | Bledsoe | Sept. 19, 1950 |
| 2,562,687 | Anderson | July 31, 1951 |
| 2,615,072 | Gilbert | Oct. 21, 1952 |
| 2,700,726 | Bassler | Jan. 25, 1955 |

FOREIGN PATENTS

| | | |
|---|---|---|
| 948,395 | France | Jan. 31, 1949 |